United States Patent Office 3,133,067
Patented May 12, 1964

3,133,067
1-MONOCARBOCYCLIC ARYL-4-THIOCARBAM-
YLPIPERAZINES AND INTERMEDIATES AND
PROCESSES THEREFOR
Sydney Archer, Bethlehem, N.Y., assignor to Sterling
Drug Inc., New York, N.Y., a corporation of Delaware
No Drawing. Filed Jan. 30, 1959, Ser. No. 790,069
23 Claims. (Cl. 260—268)

This invention relates to new 1-monocarbocyclic aryl-4-thiocarbamylpiperazines, acid-addition salts and quaternary ammonium salts thereof, methods of preparation and intermediates therefor.

A preferred aspect of the invention relates to compounds having the formula:

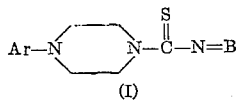

(I)

wherein Ar represents a monocarbocyclic aryl radical and N=B represents a primary amino, a lower-secondary amino or a lower-tertiary amino radical.

In the above general Formula I, Ar represents a monocarbocyclic aryl radical. It can be phenyl or phenyl substituted by one to three substituents inert under the conditions of the reaction. Preferred substituents are those selected from the group consisting of: halogen (including fluorine, chlorine, bromine and iodine), lower-alkyl, lower-alkoxy, nitro, cyano, lower-acyl, lower-alkylmercapto, lower-alkylsulfonyl, trifluoromethyl or lower-acylamino. When the phenyl radical is substituted by two or more substituents, the substituents can be the same or different and can be attached to any of the five available carbon atoms of the phenyl radical. When Ar represents phenyl substituted by lower-alkyl, lower-alkoxy, lower-acyl lower-alkylmercapto, lower-alkylsulfonyl or lower-acylamino, the lower-alkyl, lower-alkoxy, lower-acyl, lower-alkylmercapto, lower-alkylsulfonyl or lower-acylamino substituents can be straight or branched and can contain from one to about five carbon atoms. Ar thus stands, inter alia, for phenyl, 4-fluorophenyl, 4-chlorophenyl, 4-bromophenyl, 4-methylphenyl, 4-n-butylphenyl, 4-methoxyphenyl, 4-n-butoxyphenyl, 3-nitrophenyl, 4-cyanophenyl, 4-acetylphenyl, 4-isobutyrylphenyl, 4-methylmercaptophenyl, 4-isopropylmercaptophenyl, 4-methylsulfonylphenyl, 4-isopropylsulfonylphenyl, 3-trifluoromethylphenyl, 3-acetylaminophenyl, 3-isobutyrylaminophenyl, 3-chloro-4-methylphenyl, 4-chloro-2-methylphenyl, and the like.

The amino radical, represented in Formula I as N=B, comprehends pharmacodynamically acceptable primary amino, lower-secondary-amino and lower-tertiary-amino radicals having a total of from two to about twelve carbon atoms. N=B thus comprehends such well-known lower-secondary-amino radicals illustrated by: mono-(lower-alkyl)amino and mono-(lower-alkenyl)amino radicals where the lower-alkyl and lower-alkenyl radicals have from one to about six carbon atoms and which can be either straight or branched. The amino radical N=B likewise comprehends well-known lower-tertiary-amino radicals having two substituents on the nitrogen atom such as those illustrated above for the lower-secondary-amino radicals, with preferred tertiary-amino radicals being di-(lower-alkyl)amino and di-(lower-alkenyl)amino radicals where the lower-alkyl and lower-alkenyl radicals are alike or different and each alkyl and alkenyl radical has preferably from one to about six carbon atoms. Further when designating lower-tertiary-amino radicals, N=B includes the usual saturated N-heteromonocyclic radicals having five or six ring atoms, illustrated by: 1-piperidyl; (lower-alkylated)-1-piperidyl; 1-pyrrolidyl; (lower-alkyl-ated)-1-pyrrolidyl and 4-morpholinyl. Thus the entire grouping —C(=S)—N=B in Formula I above represents such groupings, inter alia, as: thiocarbamyl, methylthiocarbamyl, ethylthiocarbamyl, n-propylthiocarbamyl, iso-propylthiocarbamyl, n-pentylthiocarbamyl, propenyl-thiocarbamyl, 3-methylpropenylthiocarbamyl [CS—NHCH(CH₃)CH=CH₂], 3-ethylpropenylthiocarbamyl [CS—NHCH(C₂H₅)CH=CH₂], dimethylthiocarbamyl, diethylthiocarbamyl, di-isobutylthiocarbamyl, di-n-hexylthiocarbamyl, di-propenylthiocarbamyl, di-3-ethylpropenylthiocarbamyl, 1-pyrrolidinothiocarbonyl, 2-methyl-1-pyrrolidinothiocarbonyl, 1-piperidinothiocarbonyl, 2-methyl-1-piperidinothiocarbonyl, 4-morpholinothiocarbonyl, and the like.

The compounds of Formula I can be prepared by the following reactions in which Ar, has the meaning given above and R and R' represent lower-alkyl and lower-alkenyl radicals as defined above in the elaboration of N=B or which can be joined together to form an N-heterocyclic ring and X represents halogen:

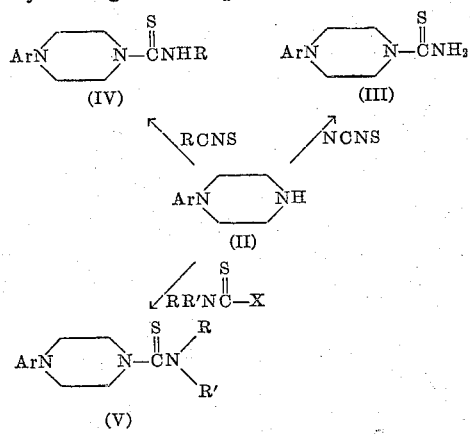

The 1-monocarbocyclic arylpiperazines of Formula II which are required for the preparation of the thiocarbamylpiperazines of Formula I are prepared by reacting a monocarbocyclic aryl-amine hydrohalide with a diethanolamine hydrohalide.

The 1-monocarbocyclic aryl-4-thiocarbamylpiperazines of Formula III are prepared by reacting the 1-monocarbocyclic arylpiperazines of Formula II with a molar equivalent amount of an alkali metal or ammonium thiocyanate in an aqueous medium containing one molar equivalent of a mineral acid such as hydrochloric acid thereby producing thiocyanic acid in situ which then reacts with the 1-monocarbocyclic arylpiperazines to form the 1-monocarbocyclic aryl-4-thiocarbamylpiperazines of Formula III. The reaction can be conducted at a temperature in the range of 15–70° C. although it is preferred to carry out the reaction around 35–40° C. The compounds of Formula III separate out as the free bases and can be recovered. They can then be converted to their acid-addition salts as will be described later.

The 1-monocarbocyclic aryl-4-thiocarbamylpiperazines of Formula IV are prepared by reacting the 1-monocarbocyclic arylpiperazines of Formula II with a molar equivalent amount of a lower-alkyl or lower-alkenyl isothiocyanate in an appropriate organic solvent inert under the conditions of reaction, at a temperature in the range of 50–150° C. Appropriate solvents are petroleum ether, benzene, toluene, xylene and the like. It is preferred that the reaction be carried out in petroleum ether at a temperature between about 60° C. and about 70° C. The compounds are isolated in the form of the free base and can be converted to their acid-addition salts as will be described later.

The 1-monocarbocyclic aryl-4-thiocarbamylpiperazines of Formula V are prepared by reacting the monocarbocyclic arylpiperazines of Formula II with a molar equivalent amount of a di-lower-alkyl-thiocarbamyl halide, a di-lower alkenyl-thiocarbamyl halide or an N-heterocyclic-thiocarbonyl halide in the presence of an acid acceptor at a temperature between about 0° C. and about 25° C. It is preferred to conduct the reaction at a temperature in the range from 0° C. to 5° C., and a preferred acid-acceptor is pyridine.

Alternatively the compounds of Formula I can be prepared from the corresponding oxygen analogs of Formula VI

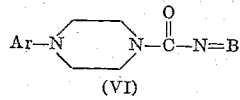

(VI)

wherein the S atom is replaced by an O atom and Ar and N=B have the meanings given above by reacting the compounds of Formula VI with phosphorus pentasulfide in an inert organic solvent such as benzene, toluene or xylene at a temperature in the range from 75° C. to 145° C. The reaction is preferably carried out in boiling toluene. Thus the compounds of Formula VI are valuable as intermediates in the preparation of compounds of Formula I.

The oxygen analogs of the compounds of Formula I are prepared in a manner similar to the preparation of the thiocarbamyl compounds. Thus the oxygen analogs of the compounds of Formula III are prepared by reacting a 1-monocarbocyclic arylpiperazine of Formula II with a molar equivalent amount of an alkali metal or ammonium cyanate in an aqueous medium containing one molar equivalent of a mineral acid such as hydrochloric acid thereby producing cyanic acid in situ which then reacts with the 1-monocarbocyclic arylpiperazine to form the 1-monocarbocyclic aryl-4-carbamylpiperazines.

Likewise the oxygen analogs of the compounds of Formula IV are prepared by reacting the 1-monocarbocyclic arylpiperazines of Formula II with a molar equivalent amount of a lower-alkyl or lower-alkenyl isocyanate in an appropriate solvent inert under the conditions of the reaction at a temperature in the range from 50° C. to 150° C.

Similarly the oxygen analogs of the aryl-4-carbamylpiperazines of Formula V are prepared by reacting the monocarbocyclic arylpiperazines of Formula II with a molar equivalent amount of a di-lower-alkyl-carbamyl halide, a di-lower-alkenylcarbamyl halide or an N-heterocyclic-carbonyl halide in the presence of an acid-acceptor at a temperature between about 0° C. and about 25° C.

Biological evaluation of the compounds of Formula I have shown that they possess useful pharmacological properties and, in particular have hypotensive and schistosomacidal activity as well as antibacterial activity, thus indicating their usefulness in lowering the blood pressure, in treating schistosomiasis and in combatting bacteria. Toxicity studies on the compounds, given intravenously in the mouse, have shown that the $LD_{50}$ for the compounds is about 40 to 50 mg./kg. $LD_{50}$ is defined as the lethal dose for 50% of the animals at that particular dose level. The oral $LD_{50}$ is of the order of magnitude of 970 mg./kg.

The acid-addition or quaternary ammonium salts of the compounds of the invention are water-soluble and are the form in which the compounds are conveniently prepared for use. Pharmacologically acceptable salts are salts whose anions are innocuous to the animal organism in pharmacological doses of the salts so that beneficial physiological properties inherent in the free bases are not vitiated by side-effects ascribable to the anions; in other words, the latter do not substantially affect the pharmacological properties inherent in the cations. Appropriate acid-addition salts are those derived from mineral acids such as hydrochloric acid, hydrobromic acid, hydriodic acid, nitric acid, sulfuric acid and phosphoric acid and organic acids such as acetic acid, citric acid, lactic acid, ethanesulfonic acid and tartaric acid. The quaternary ammonium salts are obtained by reaction of the compounds in the free base form with alkyl, alkenyl, or aralkyl esters of inorganic acids or organic sulfonic acids wherein the alkyl, alkenyl and aralkyl moieties contain from one to about ten carbon atoms. The alkyl, alkenyl or aralkyl esters so used include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the alkyl, alkenyl or aralkyl ester in an organic solvent inert under the conditions of the reaction. Heating can be used to facilitate the reaction, although salt formation usually takes place readily at room temperature. The quaternary ammonium salt separates directly or can be obtained by concentration of the solution.

Although pharmacologically acceptable salts are preferred, those having toxic anions are also useful. All acid-addition salts are useful as intermediates in purification of the free bases, and toxic acid-addition and quaternary ammonium salts are useful as intermediates in preparing pharmacologically acceptable salts by ion exchange procedures. All crystalline salts are useful as characterizing derivatives of the free base.

The structures of the compounds of the invention have been established by the mode of synthesis and corroborated by chemical analysis.

The following examples will further illustrate the invention without the latter being limited thereto.

EXAMPLE 1

*1-(3-Chlorophenyl)-4-Thiocarbamylpiperazine*

(III; Ar is 3-ClC$_6$H$_4$)

Ten grams of 1-(3-chlorophenyl)piperazine (0.05 mole) were dissolved in 50 ml. of aqueous 1 N-HCl. To the solution was added a solution of 3.8 g. (0.05 mole) of ammonium thiocyanate in 10 ml. of water. The resulting solution became cloudy on slight warming and an oil separated which solidified on chilling. The solid was recrystallized twice from water giving 8.0 g. of 1-(3-chlorophenyl)-4-thiocarbamylpiperazine, M.P. 121–124.2° C. (corr.).

*Analysis.*—Calcd. for $C_{11}H_{14}ClN_3S$: C, 51.65; H, 5.52; N, 16.43. Found: C, 51.28; H, 5.67; N, 16.50.

EXAMPLE 2

1-(4-chlorophenyl)-4-thiocarbamylpiperazine (III; Ar is 4-ClC$_6$H$_4$) was prepared from 10 g. (0.05 mole) of 1-4-chlorophenyl)piperazine and 4.1 g. (0.054 mole) of ammonium thiocyanate in aqueous hydrochloric acid according to the manipulative procedure described above in Example 1. The product was isolated as the free base and recrystallized twice from water giving 7.0 g. of 1-(4-chlorophenyl)-4-thiocarbamylpiperazine, M.P. 172.0–176.8° C. (corr.).

*Analysis.*—Calcd. for $C_{11}H_{14}ClN_3S$: C, 51.65; H, 5.52; N, 16.43. Found: C, 51.65; H, 5.41; N, 16.53.

1-(4-chlorophenyl)-4-thiocarbamylpiperazine, when tested in mice, showed schistosomacidal activity at a dose of 100 m./kg./day orally. It also showed in vitro bactericidal activity against *Staph. aureus* and *E. typhi*.

EXAMPLE 3

1-(3-chloro-4-methylphenyl)-4-thiocarbamylpiperazine (III; Ar is 3-Cl-4-CH$_3$C$_6$H$_3$) was prepared from 10.6 g. (0.05 mole) of 1-(3-chloro-4-methylphenyl)piperazine and 4.8 g. (0.05 mole) of potassium thiocyanate in aqueous hydrochloric acid according to the manipulative procedure described above in Example 1. The product was isolated as the free base and recrystallized once from water giving 6.4 g. of 1-(3-chloro-4-methylphenyl)-4-thiocarbamylpiperazine, M.P. 133.2–135.8° C. (corr.).

Analysis.—Calcd. for C$_{12}$H$_{16}$ClN$_3$S: C, 53.43; H, 5.98; N, 15.58. Found: C, 53.87; H, 6.29; N, 15.52.

1-(3-chloro-4-methylphenyl)-4-thiocarbamylpiperazine was found to be schistosomacidal in mice at doses as low as 2.5 mg./kg./day orally. It completely cleared monkeys of schistosomiasis in fifteen days when administered orally at a dose of 30 mg./kg./day for twenty-one days. It was also shown to be hypotensive at doses from 1.0 to 20 mg./kg. when administered subcutaneously in the anesthetized renal hypertensive rat. The LD$_{50}$ determined intravenously in mice has been shown to be 42±3.6 mg./kg. while the oral LD$_{50}$ in mice has been shown to be 970±157 mg./kg.

EXAMPLE 4

1-(4-Bromophenyl)-4-Thiocarbamylpiperazine (III; Ar is 4-BrC$_6$H$_4$)

By following the manipulative procedure described above in Example 1 and by replacement of the 1-(3-chlorophenyl)piperazine used therein by a molar equivalent amount of 1-(4-bromophenyl)piperazine, there can be obtained 1-(4-bromophenyl)-4-thiocarbamylpiperazine.

EXAMPLE 5

1-(4-Methylphenyl)-4-Thiocarbamylpiperazine (III; Ar is 4-CH$_3$OC$_6$H$_4$)

By following the manipulative procedure described above in Example 1 and by replacement of the 1-(3-chlorophenyl)piperazine used therein by a molar equivalent amount of 1-(4-methylphenyl)piperazine, there can be obtained 1-(4-methylphenyl)-4-thiocarbamylpiperazine.

EXAMPLE 6

1-(4-Methoxyphenyl)-4-Thiocarbamylpiperazine (III; Ar is 4-CH$_3$OC$_6$H$_4$)

By following the manipulative procedure described above in Example 1 and by replacement of the 1-(3-chlorophenyl)piperazine used therein by a molar equivalent amount of 1-(4-methoxyphenyl)piperazine, there can be obtained 1-(4-methoxyphenyl)-4-thiocarbamylpiperazine.

EXAMPLE 7

1-(3-Nitrophenyl)-4-Thiocarbamylpiperazine (III; Ar is 3-NO$_2$C$_6$H$_4$)

By following the manipulative procedure described above in Example 1 and by replacement of the 1-(3-chlorophenyl)piperazine used therein by a molar equivalent amount of 1-(3-nitrophenyl)piperazine, there can be obtained 1-(3-nitrophenyl)-4-thiocarbamylpiperazine.

EXAMPLE 8

1-(4-Cyanophenyl)-4-Thiocarbamylpiperazine (III; Ar is 4-CNC$_6$H$_4$)

By following the manipulative procedure described above in Example 1 and by replacement of the 1-(3-chlorophenyl)piperazine used therein by a molar equivalent amount of 1-(4-cyanophenyl)piperazine, there can be obtained 1-(4-cyanophenyl)-4-thiocarbamylpiperazine.

EXAMPLE 9

1-(4-Acetylphenyl)-4-Thiocarbamylpiperazine (III; Ar is 4-CH$_3$COC$_6$H$_4$)

By following the manipulative procedure described above in Example 1 and by replacement of the 1-(3-chlorophenyl)piperazine used therein by a molar equivalent amount of 1-(4-acetylphenyl)piperazine, there can be obtained 1-(4-acetylphenyl)-4-thiocarbamylpiperazine.

EXAMPLE 10

1-(4-Methylmercaptophenyl)-4-Thiocarbamylpiperazine (III; Ar is 4-CH$_3$SC$_6$H$_4$)

By following the manipulative procedure described above in Example 1 and by replacement of the 1-(3-chlorophenyl)piperazine used therein by a molar equivalent amount of 1-(4-methylmercaptophenyl)piperazine, there can be obtained 1-(4-methylmercaptophenyl)-4-thiocarbamylpiperazine.

EXAMPLE 11

1-(4-Methylsulfonylphenyl)-4-Thiocarbamylpiperazine (III; Ar is 4-CH$_3$SO$_2$C$_6$H$_4$)

By following the manipulative procedure described above in Example 1 and by replacement of the 1-(3-chlorophenyl)piperazine used therein by a molar equivalent amount of 1-(4-methylsulfonylphenyl)piperazine, there can be obtained 1-(4-methylsulfonylphenyl)-4-thiocarbamylpiperazine.

EXAMPLE 12

1-(3-Trifluoromethylphenyl)-4-Thiocarbamylpiperazine (III; Ar is 3-CF$_3$C$_6$H$_4$)

By following the manipulative procedure described above in Example 1 and by replacement of the 1-(3-chlorophenyl)piperazine used therein by a molar equivalent amount of 1-(3-trifluoromethylphenyl)piperazine, there can be obtained 1-(3-trifluoromethylphenyl)-4-thiocarbamylpiperazine.

EXAMPLE 13

1-(3-Acetylaminophenyl)-4-Thiocarbamylpiperazine (III; Ar is 3-CH$_3$CONHC$_6$H$_4$)

By treatment of the 1-(3-nitrophenyl)-4-thiocarbamylpiperazine prepared in Example 7 with iron and hydrochloric acid, there can be obtained 1-(3-aminophenyl)-4-thiocarbamylpiperazine. By treatment of the amino compound thus prepared with a molar excess of acetic anhydride in pyridine, there can be obtained 1-(3-acetylaminophenyl)-4-thiocarbamylpiperazine.

EXAMPLE 14

1-(3-Chlorophenyl)-4-Carbamylpiperazine (VI; Ar is 3-ClC$_6$H$_4$; N=B is NH$_2$)

Ten grams (0.05 mole) of 1-(3-chlorophenyl)piperazine were dissolved in 50 ml. of aqueous 1 N-HCl. To the solution was added a solution of 4.1 g. (0.05 mole) of potassium cyanate in 10 ml. of water. On short standing an oil separated which on cooling and scratching solidified. The solid was collected and recrystallized from ethanol to give 8.4 g. of 1-(3-chlorophenyl)-4-carbamylpiperazine, M.P. 188.2–191.4° C. (corr.).

Anaylsis.—Calcd. for C$_{11}$H$_{14}$ClN$_3$O: C, 55.11; H, 5.89; N, 17.53. Found: C, 55.26; H, 6.02; N, 17.66.

EXAMPLE 15

1-(4-chlorophenyl)-4-carbamylpiperazine (VI; Ar is 4-ClC$_6$H$_4$; N=B is NH$_2$) was prepared from 10.0 g. (0.05 mole) of 1-(4-chlorophenyl)piperazine and 4.1 g. (0.05 mole) of potassium cyanate in aqueous hydrochloric acid according to the manipulative procedure described above in Example 14. The product was isolated as the free base and recrystallized from ethanol giving 7.5 g. of 1-(4-chlorophenyl)-4-carbamylpiperazine, M.P. 198.0–202.8° C. (corr.).

Analysis.—Calcd. for $C_{11}H_{14}ClN_3O$: C, 55.11; H, 5.89; N, 17.53. Found: C, 54.87; H, 5.87; N, 17.46.

EXAMPLE 16

1-(3-chloro-4-methylphenyl)-4-carbamylpiperazine (VI; Ar is 2-Cl-4-$CH_3C_6H_4$; N=B is $NH_2$) was prepared from 10.5 g. (0.05 mole) of 1-(3-chloro-4-methylphenyl)piperazine and 4.1 g. (0.05 mole) of potassium cyanate in aqueous hydrochloric acid according to the manipulative procedure described above in Example 14. The product was isolated as the free base and recrystallized from ethanol to give 6.8 g. of 1-(3-chloro-4-methylphenyl)-4-carbamylpiperazine, M.P. 157.6–163.0° C. (corr.).

Analysis.—Calcd. for $C_{12}H_{16}ClN_3O$: C, 56.80; H, 6.36; Cl, 13.98. Found: C, 56.55; H, 6.36; Cl, 13.86.

EXAMPLE 17

1-(4-chloro-2-methylphenyl)-4-carbamylpiperazine (VI; Ar is 4-Cl-2-$CH_3C_6H_3$; N=B is $NH_2$) was prepared from 10.5 g. (0.05 mole) of 1-(4-chloro-2-methylphenyl)piperazine and 4.1 g. (0.05 mole) of potassium cyanate in aqueous hydrochloric acid according to the manipulative procedure described above in Example 14. The product was isolated as the free base and recrystallized from ethanol to give 3.9 g. of 1-(4-chloro-2-methylphenyl)-4-carbamylpiperazine, M.P. 222.0–225.2° C. (corr.).

Analysis.—Calcd. for $C_{12}H_{16}ClN_3O$: C, 56.80; H, 6.36; N, 16.36. Found: C, 56.82; H, 6.09; N, 16.56.

EXAMPLE 18

1-(4-Bromophenyl)-4-Carbamylpiperazine (VI; Ar is 4-$BrC_6H_4$; N=B is $NH_2$)

By following the manipulative procedure described above in Example 14 and by replacement of the 1-(3-chlorophenyl)piperazine used therein by a molar equivalent amount of 1-(4-bromophenyl)piperazine, there can be obtained 1-(4-bromophenyl)-4-carbamylpiperazine.

EXAMPLE 19

1-(4-Methylphenyl)-4-Carbamylpiperazine (VI; Ar is 4-$CH_3C_6H_4$; N=B is $NH_2$)

By following the manipulative procedure described above in Example 14 and by replacement of the 1-(3-chlorophenyl)piperazine used therein by a molar equivalent amount of 1-(4-methylphenyl)piperazine, there can be obtained 1-(4-methylphenyl)-4-carbamylpiperazine.

EXAMPLE 20

1-(4-Methoxyphenyl)-4-Carbamylpiperazine (VI; Ar is 4-$CH_3OC_6H_4$; N=B is $NH_2$)

By following the manipulative procedure described above in Example 14 and by replacement of the 1-(3-chlorophenyl)piperazine used therein by a molar equivalent amount of 1-(4-methoxyphenyl)piperazine, there can be obtained 1-(4-methoxyphenyl)-4-carbamylpiperazine.

EXAMPLE 21

1-(3-Nitrophenyl)-4-Carbamylpiperazine (VI; Ar is 3-$NO_2C_6H_4$; N=B is $NH_2$)

By following the manipulative procedure described above in Example 14 and by replacement of the 1-(3-chlorophenyl)piperazine used therein by a molar equivalent amount of 1-(3-nitrophenyl)piperazine, there can be obtained 1-(3-nitrophenyl)-4-carbamylpiperazine.

EXAMPLE 22

1-(4-Cyanophenyl)-4-Carbamylpiperazine (VI; Ar is 4-$CNC_6H_4$; N=B is $NH_2$)

By following the manipulative procedure described above in Example 14 and by replacement of the 1-(3-chlorophenyl)piperazine used therein by a molar equivalent amount of 1-(4-cyanophenyl)piperazine, there can be obtained 1-(4-cyanophenyl)-4-carbamylpiperazine.

EXAMPLE 23

1-(4-Acetylphenyl)-4-Carbamylpiperazine (VI; Ar is 4-$CH_3COC_6H_4$; N=B is $NH_2$)

By following the manipulative procedure described above in Example 14 and by replacement of the 1-(3-chlorophenyl)piperazine used therein by a molar equivalent amount of 1-(4-acetylphenyl)piperazine, there can be obtained 1-(4-acetylphenyl)-4-carbamylpiperazine.

EXAMPLE 24

1-(4-Methylmercaptophenyl)-4-Carbamylpiperazine (VI; Ar is 4-$CH_3SC_6H_4$; N=B is $NH_2$)

By following the manipulative procedure described above in Example 14 and by replacement of the 1-(3-chlorophenyl)piperazine used therein by a molar equivalent amount of 1-(4-methylmercaptophenyl)piperazine, there can be obtained 1-(4-methylmercaptophenyl)-4-carbamylpiperazine.

EXAMPLE 25

1-(4-Methylsulfonylphenyl)-4-Carbamylpiperazine (VI; Ar is 4-$CH_3SO_2C_6H_4$; N=B is $NH_2$)

By following the manipulative procedure described above in Example 14 and by replacement of the 1-(3-chlorophenyl)piperazine used therein by a molar equivalent amount of 1-(4-methylsulfonylphenyl)piperazine, there can be obtained 1-(4-methylsulfonylphenyl)-4-carbamylpiperazine.

EXAMPLE 26

1-(3-Trifluoromethylphenyl)-4-Carbamylpiperazine (VI; Ar is 3-$CF_3C_6H_4$; N=B is $NH_2$)

By following the manipulative procedure described above in Example 14 and by replacement of the 1-(3-chlorophenyl)piperazine used therein by a molar equivalent amount of 1-(3-trifluoromethylphenyl)piperazine, there can be obtained 1-(3-trifluoromethylphenyl)-4-carbamylpiperazine.

EXAMPLE 27

1-(3-Acetylaminophenyl)-4-Carbamylpiperazine (VI; Ar is 3-$CH_3CONHC_6H_4$; N=B is $NH_2$)

By treatment of the 1-(3-nitrophenyl)-4-carbamylpiperazine prepared in Example 21 with iron and hydrochloric acid, there can be obtained 1-(3-aminophenyl)-4-carbamylpiperazine. By treatment of the amino compound thus prepared with a molar excess of acetic anhydride in pyridine, there can be obtained 1-(3-acetylaminophenyl)-4-carbamylpiperazine.

EXAMPLE 28

1-(3-Chloro-4-Methylphenyl)-4-Methylthiocarbamylpiperazine (IV; Ar is 3-Cl-4-$CH_3C_6H_3$; R is $CH_3$)

Nine grams (0.43 mole) of 1-(3-chloro-4-methylphenyl)piperazine and 3.5 g. (0.048 mole) of methyl isothiocyanate in 100 ml. of petroleum ether (Skellysolve B) were heated under reflux for one hour. The reaction mixture was cooled and the solid product collected by filtration and recrystallized from ethanol. This afforded 7.0 g. of 1-(3-chloro-4-methylphenyl)-4-methylthiocarbamylpiperazine, M.P. 131.6–132.6° C. (corr.).

Analysis.—Calcd. for $C_{13}H_{18}ClN_3S$: Cl, 12.54; N, 14.80. Found: Cl, 12.42; N, 14.94.

1-(3-chloro-4-methylphenyl)-4-methylthiocarbamylpiperazine when tested in mice showed schistosomacidal activity at a dose of 50 mg./kg./day.

EXAMPLE 29

1 - (3-chloro-4-methylphenyl) - 4 - ethylthiocarbamylpiperazine (IV; Ar is 3-Cl-4-CH$_3$C$_6$H$_3$; R is C$_2$H$_5$) was prepared from 10.5 g. (0.05 mole) of 1-(3-chloro-4-methylphenyl)piperazine and 4.5 g. (0.052 mole) of ethyl isothiocyanate in 100 ml. of petroleum ether (Skellysolve B) according to the manipulative procedure described above in Example 28. The product was isolated as the free base and recrystallized from ethanol giving 7.5 g. of 1 - (3-chloro-4-methylphenyl)-4-ethylthiocarbamylpiperazine, M.P. 115.4–116.6° C. (corr.).

Analysis.—Calcd. for C$_{14}$H$_{20}$ClN$_3$S: N, 14.10; Cl, 11.91. Found: N, 14.21; Cl, 11.99.

EXAMPLE 30

1-(3-chloro - 4 - methylphenyl)-4 - n - butylcarbamylpiperazine (IV; Ar is 3-Cl-4-CH$_3$C$_6$H$_3$; R is CH$_3$(CH$_2$)$_3$) was prepared from 8.5 g. (0.04 mole) of 1-(3-chloro-4-methylphenyl)piperazine and 4.7 g. (0.04 mole) of butyl isothiocyanate in 100 ml. of petroleum ether (Skellysolve B) according to the manipulative procedure described above in Example 28. The product was isolated in the form of the free base and recrystallized from ethanol to give 7.2 g. of 1-(3-chloro-4-methylphenyl)-4-n-butylcarbamylpiperazine, M.P. 112.8–114.2° C. (corr.).

Analysis—Calcd. for C$_{16}$H$_{24}$ClN$_3$S: N, 12.90; Cl, 10.88. Found: N, 12.95; Cl, 10.60.

EXAMPLE 31

1 - (3-chloro-4-methylphenyl) - 4 - allylthiocarbamylpiperazine (IV; Ar is 3-Cl-4-CH$_3$C$_6$H$_3$; R is $$CH_2CH=CH_2)$$

was prepared from 5.2 g. (0.05 mole) of 1-(3-chloro-4-methylphenyl)piperazine and 2.5 g. (0.05 mole) of allyl isothiocyanate in 200 ml. of petroleum ether (Skellysolve B) according to the manipulative procedure described above in Example 28. The product was isolated in the form of the free base and recrystallized from a petroleum ether (Skellysolve A)-ether mixture giving 3.7 g. of 1-(3-chloro-4-methylphenyl) - 4 - allylthiocarbamylpiperazine, M.P. 77.6–80.2° C. (corr.).

Analysis.—Calcd. for C$_{15}$H$_{20}$ClN$_3$S: C, 58.14; H, 6.51; N, 13.56. Found: C, 58.21; H, 6.13; N, 13.47.

EXAMPLE 32

1-(3-Chloro-4-Methylphenyl)-4-Methylcarbamylpiperazine (VI; Ar is 3-Cl-4-CH$_3$C$_6$H$_3$; N=B is NHCH$_3$)

By following the manipulative procedure described above in Example 28 and by replacement of the methyl isothiocyanate used therein by a molar equivalent amount of methyl isocyanate, there can be obtained 1-(3-chloro-4-methylphenyl)-4-methylcarbamylpiperazine.

EXAMPLE 33

1-(3-Chloro-4-Methylphenyl)-4-Ethylcarbamylpiperazine (VI; Ar is 3-Cl-4-CH$_3$C$_6$H$_3$; N=B is NHC$_2$H$_5$)

By following the manipulative procedure described above in Example 28 and by replacement of the methyl isothiocyanate used therein by a molar equivalent amount of ethyl isocyanate, there can be obtained 1-(3-chloro-4-methylphenyl)-4-ethylcarbamylpiperazine.

EXAMPLE 34

1-(3-Chloro-4-Methylphenyl)-4-Butylcarbamylpiperazine (VI; Ar is 3-Cl-4-CH$_3$C$_6$H$_3$; N=B is NH(CH$_2$)$_3$CH$_3$)

By following the manipulative procedure described in Example 28 and by replacement of the methyl isothiocyanate used therein by a molar equivalent amount of n-butylisocyanate, there can be obtained 1-(3-chloro-4-methylphenyl)-4-n-butylcarbamylpiperazine.

EXAMPLE 35

1-Phenyl-4-Dimethylthiocarbamylpiperazine Hydrochloride (V; Ar is C$_6$H$_5$; R and R' are CH$_3$)

1-phenylpiperazine (20.2 g., 0.18 mole) was dissolved in 100 ml. of pyridine and the solution was cooled to 0° C. To the cold solution was added 22.2 g. (0.18 mole) of dimethylthiocarbamyl chloride in portions over a period of twenty minutes while maintaining the temperature between 0° and 5° C. The reaction mixture was allowed to stand several days and was then treated with 250 ml. of water. The mixture was extracted three times with benzene, the benzene extracts washed with water, dried and the solvent removed. The residue was dissolved in ethanol and the solution treated with a slight excess of alcoholic hydrochloric acid. The resulting solid (18.0 g.) was recrystallized from ethanol giving 12.5 g. of 1-phenyl-4-dimethylthiocarbamylpiperazine hydrochloride, M.P. 187.0–198.6° C. (dec.) (corr.).

Analysis.—Calcd. for C$_{13}$H$_{19}$N$_3$S.HCl: N, 14.70; Cl (ionic), 12.40. Found: N, 14.67; Cl (ionic), 12.54.

By treating an alcoholic or ethereal solution of 1-phenyl-4-dimethylthiocarbamylpiperazine with an ethereal or alcoholic solution of hydrofluoric acid, hydrobromic acid, hydriodic acid, nitric acid, sulfuric acid, phosphoric acid, acetic acid, citric acid, lactic acid, ethanesulfonic acid or tartaric acid there can be obtained, respectively, the hydrofluoride, hydrobromide, hydriodide, nitrate, sulfate (or acid sulfate), phosphate (or acid phosphate), acetate, citrate (or acid citrate), lactate, ethane sulfonate or tartrate (or acid tartrate) salts of 1-phenyl-4-dimethylthiocarbamylpiperazine.

By reacting 1-phenyl-4-dimethylthiocarbamylpiperazine with methyl bromide, methyl iodide, ethyl bromide, allyl bromide, methyl p-toluenesulfonate, benzyl chloride and o-chlorobenzyl chloride, there can be obtained, respectively, the methobromide, methiodide, ethobromide, allobromide, metho-p-toluenesulfonate, benzochloride and o-chlorobenzochloride salts.

EXAMPLE 36

1 - phenyl - 4 - diethylthiocarbamylpiperazine hydrochloride (V; Ar is C$_6$H$_5$; R and R' are C$_2$H$_5$) was prepared from 16.0 g. (0.10 mole) of phenylpiperazine and 15.0 g. (0.10 mole) of diethylthiocarbamyl chloride in 50 ml. of pyridine according to the manipulative procedure described above in Example 35. The product was converted to the hydrochloride salt and recrystallized from ethanol to give 8.8 g. of 1-phenyl-4-diethylthiocarbamylpiperazine hydrochloride, M.P. 198.0–208.4° C. (dec.) (corr.).

Analysis.—Calcd. for C$_{15}$H$_{23}$N$_3$S.HCl: C, 57.39; H, 7.71; N, 13.39. Found: C, 57.69; H, 7.45; N, 13.38.

1 - phenyl-4-diethylthiocarbamylpiperazine in the form of its hydrofluoride salt can be converted to the hydrochloride salt by passing an aqueous solution of the former over an ion-exchange resin saturated with chloride ions, for example, Rohm and Haas' Amberlite ® IRA–400 resin.

EXAMPLE 37

1-(3-chlorophenyl) - 4 - dimethylthiocarbamylpiperazine hydrochloride (V; Ar is 3-ClC$_6$H$_4$; R and R' are CH$_3$) was prepared from 27.8 g. (0.142 mole) of 1-(3-chlorophenyl)piperazine and 17.5 g. (0.142 mole) of dimethylthiocarbamyl chloride in 100 ml. of pyridine according to the manipulative procedure described above in Example 35. The product was converted to the hydrochloride salt and recrystallized from ethanol giving 12.5 g. of 1-(3-chlorophenyl)-4-dimethylthiocarbamylpiperazine hydrochloride, M.P. 182.0–192.0° C. (dec.) (corr.).

Analysis.—Calcd. for $C_{13}H_{18}ClN_3S \cdot HCl$: C, 48.74; H, 5.98; N, 13.12. Found: C, 48.86; H, 5.71; N, 13.08.

EXAMPLE 38

1-(4-chlorophenyl)-4-dimethylthiocarbamylpiperazine hydrochloride (V; Ar is $4\text{-ClC}_6H_4$; R and R' are $CH_3$) was prepared from 27 g. (0.138 mole) of 1-(4-chlorophenyl)piperazine and 17 g. (0.138 mole) of dimethylthiocarbamyl chloride in 100 ml. of pyridine according to the manipulative procedure described above in Example 35. The product was converted to the hydrochloride salt and recrystallized from ethanol giving 14.8 g. of 1-(4-chlorophenyl)-4-dimethylthiocarbamylpiperazine hydrochloride, M.P. 198.0–207.0° C. (dec.) (corr.).

Analysis.—Calcd. for $C_{13}H_{18}ClN_3S \cdot HCl$: N, 13.13; Cl (ionic), 11.07. Found: N, 13.10; Cl (ionic), 11.04.

EXAMPLE 39

1-(3-chlorophenyl)-4-diethylthiocarbamylpiperazine hydrochloride (V; Ar is $3\text{-ClC}_6H_4$; R and R' are $C_2H_5$) was prepared from 26 g. (0.132 mole) of 1-(3-chlorophenyl)piperazine and 20 g. (0.132 mole) of diethylthiocarbamyl chloride in 100 ml. of pyridine according to the manipulative procedure described above in Example 35. The product was converted to the hydrochloride salt and recrystallized from ethanol giving 10.5 g. of 1-(3-chlorophenyl)-4-diethylthiocarbamylpiperazine hydrochloride, M.P. 189.0–193.8° C. (dec.) (corr.).

Analysis.—Calcd. for $C_{15}H_{22}ClN_3S \cdot HCl$: N, 12.06; Cl (ionic), 10.18. Found: N, 12.13; Cl (ionic), 9.89.

EXAMPLE 40

1-(4-chlorophenyl)-4-diethylthiocarbamylpiperazine hydrochloride (V; Ar is $4\text{—ClC}_6H_4$; R and R' are $C_2H_5$) was prepared from 26.8 g. (0.132 mole) of 1-(4-chlorophenyl)piperazine and 20 g. (0.132 mole) of diethylthiocarbamyl chloride in 100 ml. of pyridine according to the manipulative procedure described above in Example 35. The product was converted to the hydrochloride salt and recrystallized from ethanol giving 10.0 g. of 1-(4-chlorophenyl)-4-diethylthiocarbamylpiperazine hydrochloride, M.P. 204.6–208.0° C. (dec.) (corr.).

Analysis.—Calcd. for $C_{15}H_{22}ClN_3S \cdot HCl$: N, 12.06; Cl (ionic), 10.18. Found: N, 11.96; Cl (ionic), 10.40.

EXAMPLE 41

1-(3-chloro-4-methylphenyl)-4-diethylthiocarbamylpiperazine hydrochloride (V; Ar is $3\text{-Cl-}4\text{-CH}_3C_6H_3$;

R and R' are $C_2H_5$) was prepared from 21.1 g. (0.1 mole) of 1-(3-chloro-4-methylphenyl)piperazine and 12.3 g. (0.1 mole) of diethylthiocarbamyl chloride in 50 ml. of pyridine according to the manipulative procedure described above in Example 35. The product was converted to the hydrochloride salt and recrystallized once from ethanol and twice from methanol giving 6.5 g. of 1-(3-chloro-4-methylphenyl)-4-diethylthiocarbamylpiperazine hydrochloride, M.P. 211.4–216.4° C. (corr.).

Analysis.—Calcd. for $C_{16}H_{24}ClN_3S \cdot HCl$: C, 53.02; H, 6.95; N, 11.60. Found: C, 52.75; H, 6.72; N, 11.60.

1-(3-chloro-4-methylphenyl)-4-diethylthiocarbamylpiperazine hydrochloride when tested in mice was found to be schistosomacidally effective at a dose of 200 mg./kg./day.

EXAMPLE 42

1-(3-Chloro-4-Methylphenyl)-4-Dimethylcarbamylpiperazine Hydrochloride (VI; Ar is $3\text{-Cl-}4\text{-CH}_3C_6H_3$; N=B is $N(C_2H_5)_2$)

By following the manipulative procedure described above in Example 41 and by replacement of the diethylthiocarbamyl chloride used therein by a molar equivalent amount of dimethylcarbamyl chloride, there can be obtained 1-(3-chloro-4-methylphenyl)-4-dimethylcarbamylpiperazine hydrochloride.

EXAMPLE 43

1-(3-Chloro-4-Methylphenyl)-4-Diethylcarbamylpiperazine Hydrochloride (VI; Ar is $3\text{-Cl-}4\text{-CH}_3C_6H_3$; N=B is $N(C_2H_5)_2$)

By following the manipulative procedure described above in Example 41 and by replacement of the diethylthiocarbamyl chloride used therein by a molar equivalent amount of diethylcarbamyl chloride, there can be obtained 1-(3-chloro-4-methylphenyl)-4-diethylcarbamylpiperazine hydrochloride.

EXAMPLE 44

1-(3-Chloro-4-Methylphenyl)-4-(N-Pyrrolidinothiocarbonyl)piperazine Hydrochloride (V; Ar is $3\text{-Cl-}4\text{-CH}_3C_6H_3$; NRR' is $\overline{NCH_2CH_2CH_2CH_2}$)

By following the manipulative procedure described above in Example 41 and by replacement of the diethylthiocarbamyl chloride used therein by a molar equivalent amount of N-pyrrolidinothiocarbonyl chloride, there can be obtained 1-(3-chloro-4-methylphenyl)-4-(N-pyrrolidindinothiocarbonyl)piperazine hydrochloride.

EXAMPLE 45

1-(3-Chloro-4-Methylphenyl)-4-(N-Piperidinothiocarbonyl)piperazine Hydrochloride (V; Ar is $3\text{-Cl-}4\text{-CH}_3C_6H_3$; NRR' is $\overline{NCH_2CH_2CH_2CH_2CH_2}$)

By following the manipulative procedure described above in Example 41 and by replacement of the diethylthiocarbamyl chloride used therein by a molar equivalent amount of N-piperidinothiocarbonyl chloride, there can be obtained 1-(3-chloro-4-methylphenyl)-4-(N-piperidinothiocarbonyl)piperazine hydrochloride.

EXAMPLE 46

1-(3-Chloro-4-Methylphenyl)-4-(N-Morpholinothiocarbonyl)piperazine Hydrochloride (V; Ar is $3\text{-Cl-}4\text{-CH}_3C_6H_3$; NRR' is $\overline{NCH_2CH_2OCH_2CH_2}$)

By following the manipulative procedure described above in Example 41 and by replacement of the diethylthiocarbamyl chloride used therein by a molar equivalent amount of N-morpholinothiocarbonyl chloride, there can be obtained 1-(3-chloro-4-methylphenyl)-4-(N-morpholinothiocarbonyl)piperazine hydrochloride.

The compounds of the invention can be prepared for use by dissolving under sterile conditions a salt form of the compounds in water (or an equivalent amount of a non-toxic acid if the free base is used), or in a physiologically compatible aqueous medium such as saline, and stored in ampules for intramuscular or intravenous injection. Alternatively, they can be incorporated in tablet or capsule form for oral administration. They are formulated and used in the same way as known compounds having similar activity.

When used as anti-bacterial agents the compounds are prepared for use by dissolving a salt form in an aqueous medium containing a surfactant, and applied to a surface to be disinfected by conventional means such as spraying, swabbing, immersion and the like.

I claim:

1. A member of the group consisting of (A) compounds having the formula

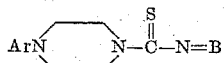

wherein Ar represents a member of the group consisting of phenyl and phenyl substituted by from one to three members of the group consisting of halogen, lower-alkyl, lower-alkoxy, nitro, cyano, lower-alkanoyl, lower-alkylmercapto, lower-alkylsulfonyl, trifluoromethyl and lower-alkanoylamino, and N=B represents a member of the group consisting of amino, mono-(lower-alkyl)amino, mono-(lower-alkenyl)amino, di-(lower-alkyl)amino, di-(lower-alkenyl)amino, 1-piperidyl, (lower-alkylated)-1-piperidyl, 1-pyrrolidyl, (lower-alkylated)-1-pyrrolidyl and 4-morpholinyl; (B) acid-addition salts; and (C) lower-alkyl, lower-alkenyl and monocarbocyclic aryl-lower-alkyl quaternary ammonium salts thereof.

2. An acid-addition salt of a compound having the formula

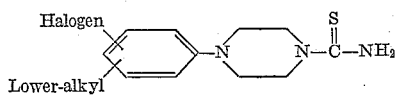

3. An acid-addition salt of a compound having the formula

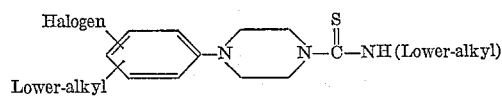

4. An acid-addition salt of a compound having the formula

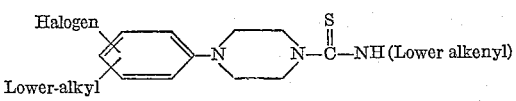

5. An acid-addition salt of a compound having the formula

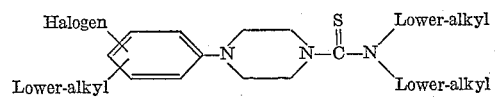

6. An acid-addition salt of 1-(3-chloro-4-methylphenyl)-4-thiocarbamylpiperazine.

7. An acid-addition salt of 1-(4-chlorophenyl)-4-thiocarbamylpiperazine.

8. An acid-addition salt of 1-(3-chloro-4-methylphenyl)-4-methylthiocarbamylpiperazine.

9. An acid-addition salt of 1-(3-chloro-4-methylphenyl)-4-allylthiocarbamylpiperazine.

10. An acid-addition salt of 1-(3-chloro-4-methylphenyl)-4-diethylthiocarbamylpiperazine.

11. A compound having the formula

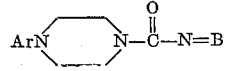

wherein Ar represents a member of the group consisting of phenyl and phenyl substituted by from one to three members of the group consisting of halogen, lower-alkyl, lower-alkoxy, nitro, cyano, lower-alkanoyl, lower-alkylmercapto, lower-alkylsulfonyl, trifluoromethyl, and lower-alkanoylamino, and N=B represents a member of the group consisting of primary amino, mono-(lower-alkyl)amino, mono-(lower-alkenyl)amino, di-(lower-alkyl)amino, di-(lower-alkenyl)amino, 1-piperidyl, (lower-alkylated)-1-piperidyl, 1-pyrrolidyl, (lower-alkylated)-1-pyrrolidyl and 4-morpholinyl.

12. A compound having the formula

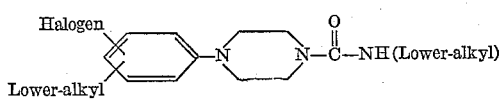

13. A compound having the formula

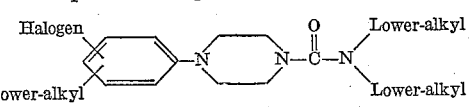

14. 1-(4-chlorophenyl)-4-carbamylpiperazine.

15. 1-(3-chloro-4-methylphenyl)-4-carbamylpiperazine.

16. 1-(3-chlorophenyl)-4-carbamylpiperazine.

17. 1-(4-chloro-2-methylphenyl)-4-carbamylpiperazine.

18. An acid-addition salt of a compound having the formula

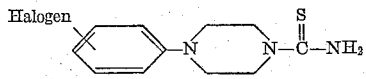

19. An acid-addition salt of a compound having the formula

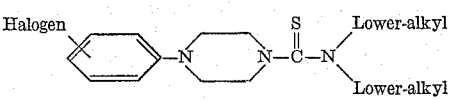

20. An acid-addition salt of a compound having the formula

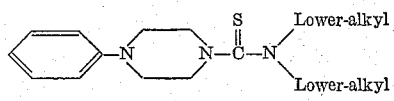

21. A compound having the formula

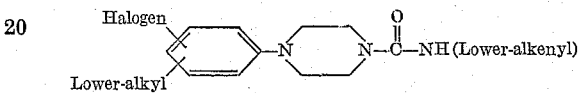

22. A compound having the formula

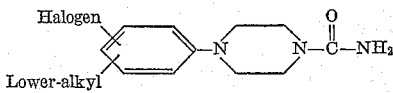

23. A process for preparing a compound having the formula

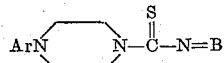

wherein Ar represents a member of the group consisting of phenyl and phenyl substituted by from one to three members of the group consisting of halogen, lower-alkyl, lower-alkoxy, nitro, cyano, lower-alkanoyl, lower-alkylmercapto, lower-alkylsulfonyl, trifluoromethyl, and lower-alkanoylamino, and N=B represents a member of the group consisting of primary amino, mono-(lower-alkyl)amino, mono-(lower-alkenyl)amino, di-(lower-alkyl)amino, di-(lower-alkenyl)-amino, 1-piperidyl, (lower-alkylated)-1-piperidyl, 1-pyrrolidyl, (lower-alkylated)-1-pyrrolidyl, and 4-morpholinyl which comprises reacting with phosphorous pentasulfide a compound having the formula

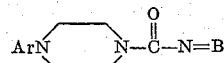

wherein Ar and N=B have the meanings given above.

References Cited in the file of this patent

UNITED STATES PATENTS

| | | |
|---|---|---|
| 2,519,715 | Stewart | Aug. 22, 1950 |
| 2,602,796 | Stewart | July 8, 1952 |
| 2,617,804 | Goldman et al. | Nov. 11, 1952 |
| 2,666,055 | Conroy | Jan. 12, 1954 |
| 2,807,617 | Dalalian et al. | Sept. 24, 1957 |
| 2,880,209 | Harfenist | Mar. 31, 1959 |

FOREIGN PATENTS

| | | |
|---|---|---|
| 790,800 | Great Britain | Feb. 19, 1958 |

OTHER REFERENCES

Buck et al.: Jour. Amer. Chem. Soc., vol. 66, pages 263–266 (1944).

Conant et al.: The Chemistry of Org. Compounds (third edition) (1947), page 342.

Shriner et al.: Identification of Organic Compounds third edition, pages 174–175 (1949).

Pollard et al.: Jour. Amer. Chem. Soc., vol. 76, pages 1853–1855 (1954).

Pollard et al.: Jour. Amer. Chem. Soc., vol. 77, pages 40–42 (1955).

UNITED STATES PATENT OFFICE
CERTIFICATE OF CORRECTION

Patent No. 3,133,067                                                      May 12, 1964

Sydney Archer

It is hereby certified that error appears in the above numbered patent requiring correction and that the said Letters Patent should read as corrected below.

Column 5, line 38, for "(III; Ar is $4\text{-}CH_3OC_6H_4$)" read -- (III; Ar is $4\text{-}CH_3C_6H_4$) --; column 9, line 73, after "described" insert -- above --.

Signed and sealed this 15th day of September 1964.

(SEAL)
Attest:

ERNEST W. SWIDER
Attesting Officer

EDWARD J. BRENNER
Commissioner of Patents